Patented Apr. 7, 1931

1,799,804

UNITED STATES PATENT OFFICE

FERDINAND W. NITARDY, OF BROOKLYN, NEW YORK, ASSIGNOR TO E. R. SQUIBB AND SONS, OF NEW YORK, N. Y., A CORPORATION OF NEW YORK

COMPOSITION CONTAINING AGAR AND METHOD OF PREPARING SAME

No Drawing.   Application filed January 5, 1925.  Serial No. 740.

This invention relates to compositions containing agar agar in the presence of water and particularly to emulsions including oils such as liquid petrolatum or oils intended for laxative purposes.

Agar is a substance which is derived from certain sea weeds and has the property of forming jellies in the presence of water. This property is so marked that a firm jelly can be obtained by boiling one part or less of agar in one hundred parts of water. Consequently in preparing products containing agar which are intended to be marketed or used in a liquid condition, it has been necessary heretofore to limit the proportion of agar in the presence of water to about one-half of one per cent. or less. Emulsions of petrolatum containing agar have been known heretofore but in such emulsions much less than one per cent. of agar has been introduced because it has been impossible otherwise to maintain the emulsions in liquid condition. It has been customary, therefore, to combine about one per cent. of agar in water and to produce thereby a viscous liquid which is subsequently emulsified with the oil, resulting in a product containing about one-half of one per cent. of agar if a fifty per cent. oil emulsion is made. It is desirable in such emulsions to employ a considerably higher proportion of agar, but the physical properties of the material have prevented the preparation of such products.

It is the object of the present invention to provide products containing agar in the presence of water which remain indefinitely in the liquid state and contain, nevertheless, a greater proportion of agar than would normally form a solid jelly.

I have discovered that agar jellies can be comminuted or otherwise reduced to a finely divided condition and that in this condition the jelly can be combined with liquids in the presence of water without solidification of the product. The comminuted jelly, which may be referred to as "powdered jelly", is best prepared by boiling the required amount of agar in water in proportions which upon cooling would normally produce a solid product, that is to say, a jelly. While the hot solution is cooling slowly it is stirred vigorously with the result that the product is a mass of small jelly particles in a semi-liquid form. The comminuted jelly thus prepared can be combined with other ingredients such as oil and water to produce emulsions without causing hardening of the mass even though the proportion of agar in the product exceeds to a considerable extent the proportion which would normally result in the production of a jelly. I prefer to prepare emulsions containing more than one per cent. of agar and the proportion of agar may be one and one-half per cent. or more.

In carrying out the invention I employ agar of commercial quality such as is suitable for and is used in pharmaceutical preparations. The agar is dissolved in boiling water in the desired proportion, preferably exceeding eight per cent., that is to say, an amount which would normally form a very tough jelly when the solution is permitted to cool. The boiling solution is filtered to remove any extraneous material which may be present in the agar and the filtrate is permitted to cool slowly while it is agitated vigorously. The time required for cooling will vary depending on the amount of the solution in the batch. In preparing the material on a large scale, it is necessary to allow approximately twenty-four hours for cooling. The stirring must be continued throughout the period of cooling as the mass is likely otherwise to set and jelly which is unsuitable for the purpose. If the cooling and stirring are conducted properly a semi-liquid mass is obtained in which the agar jelly is divided in a multitude of very fine particles which are stable and do not tend to form a firm jelly-like product.

The comminuted jelly is then incorporated with the balance of the water and with the oil required for the preparation of the emulsion. Flavoring materials and glycerin can be added at this stage and it is desirable under some conditions to employ emulsifying agents such as acacia or other gums to facilitate the operation of emulsifying the mass. The mixture is then placed in a suitable apparatus, numerous examples of which can be found in the trade, which thoroughly incorporate and emulsify the ingredients, producing thereby a liquid which remains permanently in this form under all ordinary conditions of handling and storage. The liquids which I have prepared are not affected by continued shaking or by exposure to high summer temperatures or to freezing. In the appended claims such temperatures, that is, from freezing temperatures to about 95° F. to 100° F., are designated as "ordinary temperatures". The liquids are well adapted consequently to handling, transportation and storage during marketing and use.

The emulsion should contain preferably about fifty per cent. of an oil such as liquid petrolatum although the percentage of oil can be varied and the amount introduced will depend upon the purpose for which the product is used. In other words, the proportion of oil is not critical and the invention does not depend thereon. The product will contain, however, a percentage of agar which under normal conditions would form in the presence of water a solid jelly, but when prepared in accordance with the method herein described the product is a liquid which can be marketed in bottles and poured without difficulty therefrom.

The product is markedly superior to similar products which have been prepared and used heretofore because of the presence of a higher proportion of agar. The therapeutic benefit of the use of larger proportions of agar is well understood, but such use has been limited heretofore for the reasons stated.

While the invention relates more particularly to the preparation of emulsions of oil containing agar, it is to be understood that the method can be employed in preparing any product in a liquid condition and containing agar in larger proportions than would form a solid jelly under normal conditions.

Various changes may be made in the details of the operation and in the ingredients and proportions of the composition without departing from the invention or sacrificing any of the advantages thereof.

I claim:—

1. A product liquid at ordinary temperature consisting of an emulsion of oil used for laxative purposes and water containing a proportion of agar which would form normally a firm jelly.

2. A product liquid at ordinary temperature consisting of an emulsion of oil used for laxative purposes and water containing more than one per cent. of agar.

3. A product liquid at ordinary temperature consisting of an emulsion of oil used for laxative purposes and water containing approximately one and one-half per cent. of agar.

4. A product liquid at ordinary temperature consisting of an emulsion of liquid petrolatum and water containing a proportion of agar which would form normally a firm jelly.

5. A product liquid at ordinary temperature consisting of an emulsion of liquid petrolatum and water containing more than one per cent. of agar.

6. A product liquid at ordinary temperature consisting of an emulsion of liquid petrolatum and water containing approximately one and one-half per cent. of agar.

7. The method of preparing liquid products containing agar in an amount greater than that which would normally form a firm jelly in the presence of water, which comprises dissolving agar in hot water in the proportions required to form a firm jelly, cooling and stirring the solution to produce a semi-liquid mass of comminuted jelly particles and emulsifying the comminuted jelly particles with a mixture of liquid petrolatum and water.

8. The method of preparing liquid products containing agar in an amount greater than that which would normally form a firm jelly in the presence of water, which comprises dissolving agar in hot water in the proportions required to form a firm jelly, cooling and stirring the solution to produce a semi-liquid mass of comminuted jelly particles and emulsifying the comminuted jelly particles with a mixture of an oil used for laxative purposes and water.

In testimony whereof I affix my signature.

FERDINAND W. NITARDY.